(12) United States Patent
Yokoyama et al.

(10) Patent No.: US 8,597,038 B2
(45) Date of Patent: Dec. 3, 2013

(54) CONNECTOR

(75) Inventors: Yohei Yokoyama, Tokyo (JP);
Masayuki Katayanagi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 15 days.

(21) Appl. No.: 13/403,632

(22) Filed: Feb. 23, 2012

(65) Prior Publication Data

US 2012/0220146 A1 Aug. 30, 2012

(30) Foreign Application Priority Data

Feb. 24, 2011 (JP) .................................. 2011-039047

(51) Int. Cl.
*H01R 13/62* (2006.01)

(52) U.S. Cl.
USPC .......................................................... 439/160

(58) Field of Classification Search
USPC ................................. 439/159, 160
See application file for complete search history.

(56) References Cited

U.S. PATENT DOCUMENTS

| | | | | |
|---|---|---|---|---|
| 5,492,481 A * | 2/1996 | Lewis | .............. | 439/159 |
| 5,863,212 A * | 1/1999 | Duesterhoeft | .............. | 439/160 |
| 5,921,792 A * | 7/1999 | Chen | .............. | 439/160 |
| 5,967,811 A * | 10/1999 | Yamamoto et al. | .............. | 439/159 |
| 5,967,812 A * | 10/1999 | Tung et al. | .............. | 439/159 |
| 5,989,045 A * | 11/1999 | Kimura | .............. | 439/159 |
| 5,997,325 A * | 12/1999 | Hara | .............. | 439/159 |
| 6,017,230 A * | 1/2000 | Yao | .............. | 439/159 |
| 6,022,228 A * | 2/2000 | Kuo | .............. | 439/159 |
| 6,030,238 A * | 2/2000 | Dong | .............. | 439/159 |
| 6,042,404 A * | 3/2000 | Lai et al. | .............. | 439/159 |
| 6,065,984 A * | 5/2000 | Tung | .............. | 439/159 |
| 6,071,134 A * | 6/2000 | Tung | .............. | 439/159 |
| 6,089,889 A * | 7/2000 | Chiou et al. | .............. | 439/159 |
| 6,120,309 A * | 9/2000 | Hara | .............. | 439/159 |
| 6,155,852 A * | 12/2000 | Ozawa et al. | .............. | 439/159 |
| 6,159,027 A * | 12/2000 | Kuo | .............. | 439/159 |
| 6,174,181 B1 * | 1/2001 | Lai | .............. | 439/159 |
| 6,234,813 B1 * | 5/2001 | Hanyu | .............. | 439/159 |
| 6,340,305 B1 * | 1/2002 | Liu | .............. | 439/159 |
| 6,364,674 B1 * | 4/2002 | Kajiura | .............. | 439/159 |
| 6,413,106 B1 * | 7/2002 | Yu | .............. | 439/159 |
| 6,439,904 B1 * | 8/2002 | Hu et al. | .............. | 439/159 |
| 6,478,590 B1 * | 11/2002 | Kuo | .............. | 439/159 |
| 6,702,599 B2 * | 3/2004 | Hu et al. | .............. | 439/159 |

(Continued)

FOREIGN PATENT DOCUMENTS

| | | |
|---|---|---|
| JP | 9-007693 A | 1/1997 |
| JP | 2008-108695 A | 5/2008 |

*Primary Examiner* — Ross Gushi
(74) *Attorney, Agent, or Firm* — Holtz, Holtz, Goodman & Chick, PC

(57) ABSTRACT

A connector is connectable to a card. The connector comprises an eject member including a pressed portion. The eject member is configured to eject the card along an eject direction when the pressed portion is pressed by an operation member separated from the connector and having a tip. The pressed portion is formed by bending a metal plate so as to have a receiving wall and a side wall. The receiving wall is configured to be brought into abutment with the tip of the operation member so that the pressed portion is pressed by the operation member. The side wall extends in a direction crossing the receiving wall so that the side wall is located lateral to the tip upon the abutment of the tip with the receiving wall.

16 Claims, 6 Drawing Sheets

(56) References Cited

U.S. PATENT DOCUMENTS

| | | | |
|---|---|---|---|
| 7,118,396 B2* | 10/2006 | Ting | 439/159 |
| 7,232,320 B2* | 6/2007 | Kuo | 439/159 |
| 7,491,073 B2* | 2/2009 | Cheng | 439/159 |
| 7,510,415 B2* | 3/2009 | Wang | 439/159 |
| 7,537,470 B2* | 5/2009 | Yamaguchi | 439/159 |
| 7,766,678 B1* | 8/2010 | Abe | 439/159 |
| 7,789,683 B2* | 9/2010 | Ting | 439/159 |
| 7,811,106 B2* | 10/2010 | Lin et al. | 439/159 |
| 7,837,486 B2* | 11/2010 | Li | 439/159 |
| 7,927,116 B2* | 4/2011 | Nagarajan et al. | 439/159 |
| 2001/0005644 A1* | 6/2001 | Hashimoto | 439/159 |
| 2002/0009911 A1* | 1/2002 | Uchikawa | 439/159 |
| 2002/0048979 A1* | 4/2002 | Kodama et al. | 439/159 |
| 2002/0048980 A1* | 4/2002 | Kodama et al. | 439/159 |
| 2003/0114031 A1* | 6/2003 | Hu et al. | 439/159 |
| 2004/0038570 A1* | 2/2004 | He | 439/159 |
| 2004/0248445 A1* | 12/2004 | Lai et al. | 439/159 |
| 2005/0142913 A1* | 6/2005 | Cheng | 439/159 |
| 2006/0166533 A1* | 7/2006 | Muramatsu et al. | 439/160 |
| 2006/0246757 A1* | 11/2006 | Ting et al. | 439/159 |
| 2008/0096409 A1* | 4/2008 | Cheng | 439/159 |
| 2008/0096410 A1* | 4/2008 | Cheng | 439/159 |
| 2010/0099284 A1* | 4/2010 | Palani et al. | 439/159 |
| 2010/0120277 A1* | 5/2010 | Nagarajan et al. | 439/159 |
| 2012/0220146 A1* | 8/2012 | Yokoyama et al. | 439/159 |
| 2013/0084724 A1* | 4/2013 | Yokoyama et al. | 439/160 |

* cited by examiner

CONNECTOR

CROSS REFERENCE TO RELATED APPLICATIONS

Applicants claim priority under 35 U.S.C. §119 of Japanese Patent Application No. JP2011-39047 filed Feb. 24, 2011.

BACKGROUND OF THE INVENTION

This invention relates to a connector connectable to a card such as a SIM (Subscriber Identity Module) card.

For example, this type of connectors is disclosed in JP-A 2008-108695 or JP-A H9(1997)-7693, contents of which are incorporated herein by reference.

The connector disclosed in JP-A 2008-108695 is connectable to a memory card such as a MMC (Multi Media Card). The memory card is accommodated in and ejected from the connector in a state where the memory card is mounted on a tray having a hole. In detail, the connector is provided with a lock mechanism to lock the tray therein and a push lever configured to be operated by a pin (operation member) having a tip. The push lever is pressed by the tip of the pin inserted through the hole of the tray so that the tray is unlocked. The tray released from the lock mechanism is ejected from the connector accompanied by the card.

The connector disclosed in JP-A H9(1997)-7693 is connectable to a small circuit board such as a memory module. The connector is provided with an eject button which is made by molding, for example, a resin. The eject button has an operated surface configured to be operated by an operation tool (operation member) having a tip. The operated surface is formed with a depression. The eject button is pressed by the tip which is engaged with the depression so that the small circuit board is removed from the connector.

As for the connector of JP-A 2008-108695, a large load might be applied to the pin when the pin presses the push lever so that the tip of the pin might come off the push lever. Moreover, the tip of the pin coming off the push lever may damage components which are arranged around a position where the connector is installed.

The connector of JP-A H9(1997)-7693 has a relatively large size so that it is possible to form the depression of the operated surface to have a relatively large size. If the tip of the operation tool is engaged with the depression having enough size, the tip is nearly prevented from coming off the depression. However, when the connector has a smaller size, the depression may be smaller. It is difficult to properly engage the tip of the operation tool with the depression having small size so that the tip may come off the depression. Moreover, it is necessary to enlarge the eject button to a certain size so that the eject button formed with the depression has an enough strength. As can be seen from the above description, the structure of the eject button of JP-A 2008-108695 is not easily applicable to a relatively small connector such as the connector of JP-A 2008-108695.

SUMMARY OF THE INVENTION

It is therefore an object of the present invention to provide a connector having a pressed portion configured to be pressed by a tip of an operation member, wherein the pressed portion is designed to prevent the tip pressing the pressed portion from coming off even if the connector has a relatively small size.

One aspect of the present invention provides a connector connectable to a card. The connector comprises an eject member including a pressed portion. The eject member is configured to eject the card along an eject direction when the pressed portion is pressed by an operation member separated from the connector and having a tip. The pressed portion is formed by bending a metal plate so as to have a receiving wall and a side wall. The receiving wall is configured to be brought into abutment with the tip of the operation member so that the pressed portion is pressed by the operation member. The side wall extends in a direction crossing the receiving wall so that the side wall is located lateral to the tip upon the abutment of the tip with the receiving wall.

Another aspect of the present invention provides a device. The device comprises the connector described above and a tray configured to mount the card. The connector and the tray are configured so that the tray is insertable into the connector in a state where the card is mounted on the tray. The tray is provided with a force-applied portion. When the pressed portion is pressed by the operation member, the eject member applies a force along the eject direction to the force-applied portion of the tray to push out the tray so that the card is ejected.

An appreciation of the objectives of the present invention and a more complete understanding of its structure may be had by studying the following description of the preferred embodiment and by referring to the accompanying drawings.

Figure 1:
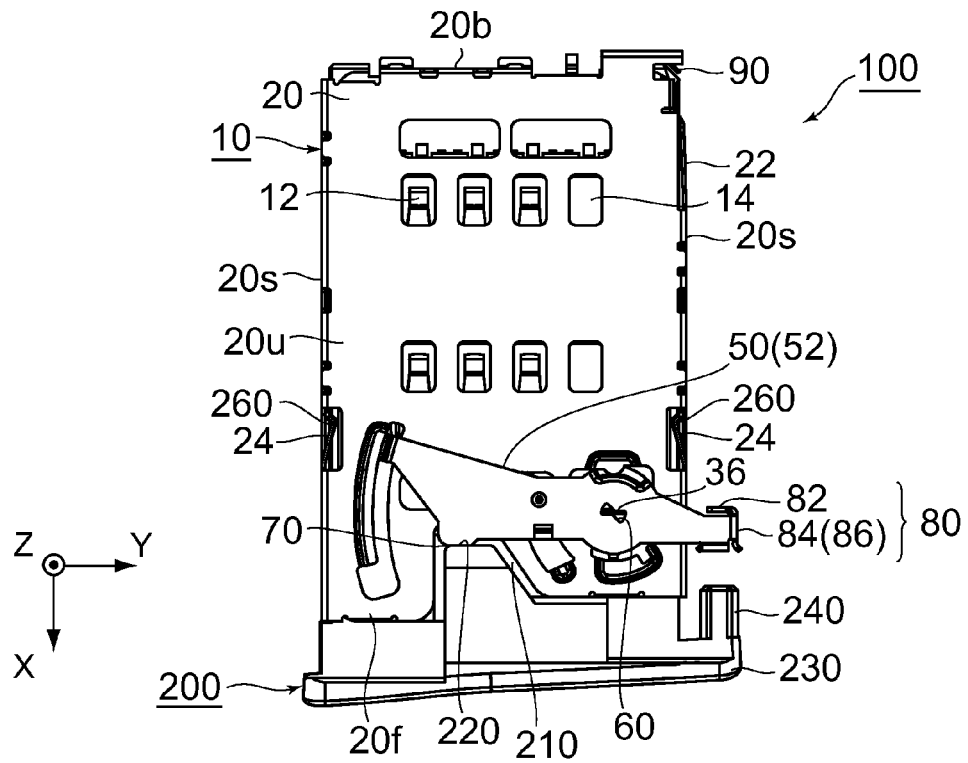
FIG. 1 is a plan view showing a device according to an embodiment of the present invention, wherein an eject member of a connector is located at an accommodate position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
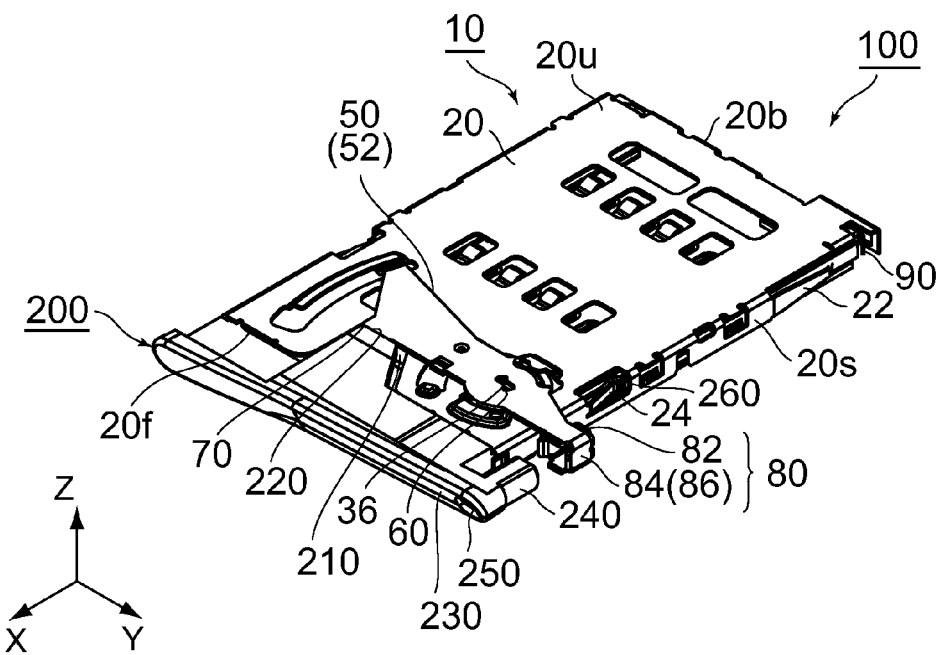
FIG. 2 is a perspective view showing the device of FIG. 1.
Figure 3:
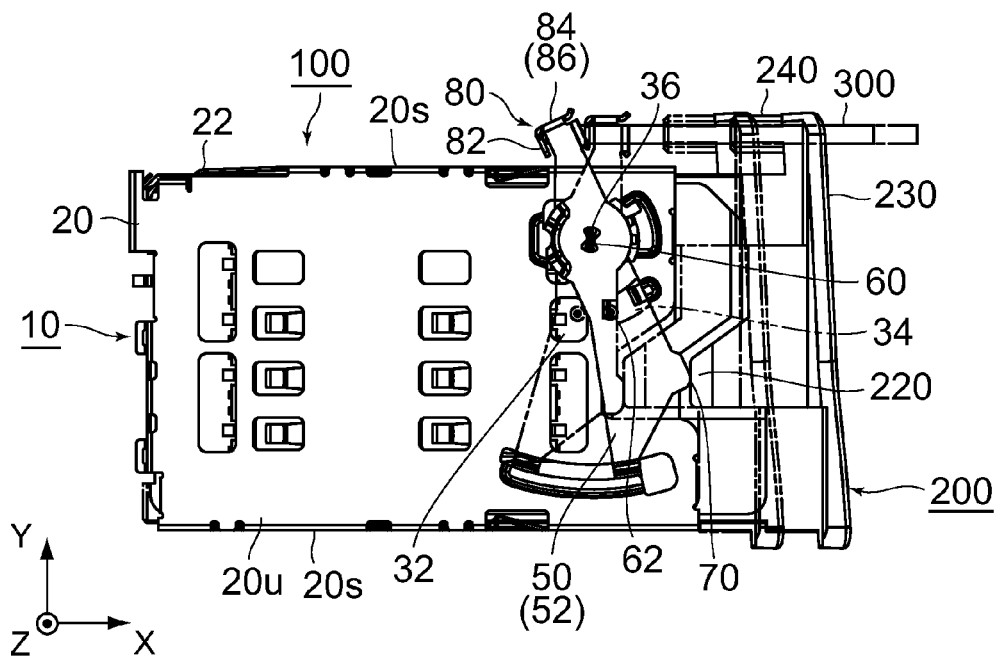
FIG. 3 is a plan view showing the device of FIG. 1, wherein the eject member is located at a release position. The eject member located at the accommodate position is illustrated by dashed lines.
Figure 4:
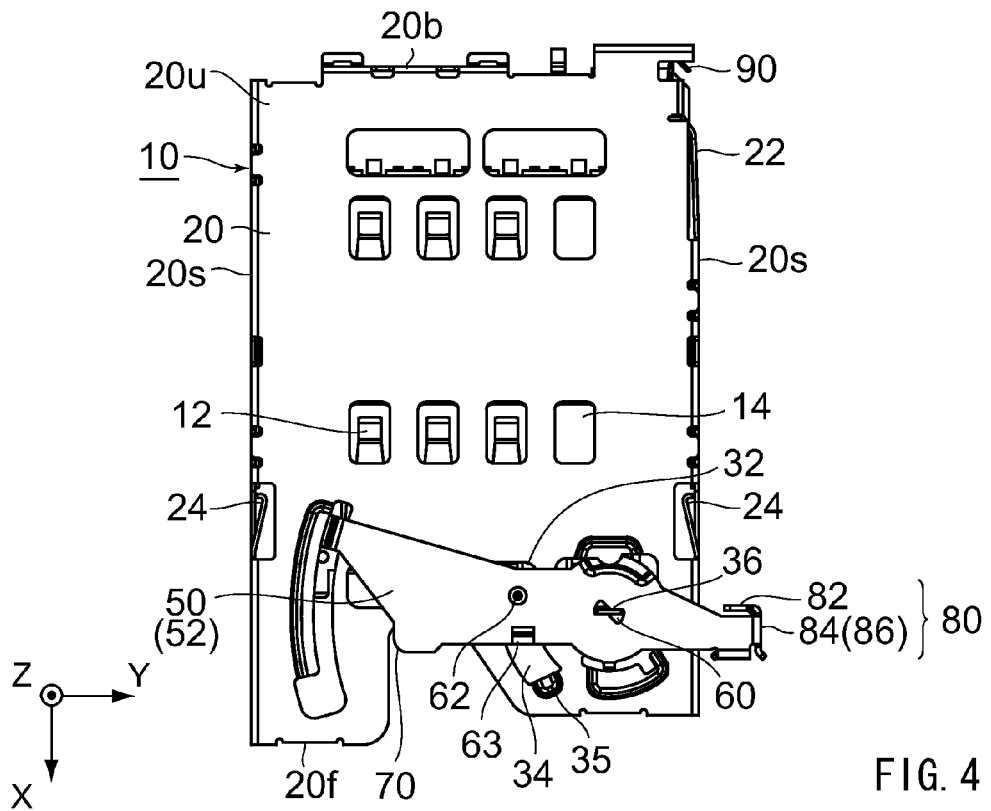
FIG. 4 is a plan view showing the connector of the device of FIG. 1.

Referring to FIGS. 1 to 3, a device 100 according to an embodiment of the present invention comprises a tray 200 configured to mount a card (not shown) and a connector 10 configured to accommodate the tray 200 partially. The card (not shown) according to the present embodiment is, for example, a SIM card. The connector 10 is connectable to the card (not shown). More specifically, the connector 10 and the tray 200 are configured so that the tray 200 is insertable into the connector 10 in a state where the card (not shown) is mounted on the tray 200. The card (not shown) mounted on the tray 200 and inserted in the connector 10 is electrically connected to the connector 10.

As shown in FIGS. 1 to 3, the tray 200 according to the present embodiment is made of a molded resin. The tray 200 is provided with a mount portion 210, a force-applied portion 220, a front wall 230, a rod-like portion 240, a guide channel 250 and two recesses 260. The mount portion 210 is configured to mount the card (not shown). The force-applied portion 220 is configured to receive a force along the positive X-direction (eject direction) when the tray 200 and the card (not shown) is ejected from the connector 10. More specifically, the force-applied portion 220 is located over the positive Z-side of the mount portion 210 so as to protrude along the negative X-direction (pressing direction opposing to the eject direction). The front wall 230 is formed from the positive X-side end (i.e. front end) of the tray 200. The front wall 230 has opposite lateral ends in the Y-direction (lateral direction). The front wall 230 is pushed when the tray 200 is pushed into the connector 10 along the negative X-direction. The front wall 230 is located forward of the connector 10 in the positive X-direction under a connected state where the card (not shown) mounted on the tray 200 is inserted into and connected to the connector 10. The rod-like portion 240 is formed in the vicinity of one of the lateral ends of the front wall 230 so as to extend from the front wall 230 along the negative X-direction under the connected state. The guide channel 250 is a through hole which pierces the front wall 230 and the rod-like portion 240 along the negative X-direction. The two recesses 260 are formed on opposite sides in the Y-direction of the tray 200, respectively. The recess 260 is recessed inward in the Y-direction.

Referring to FIGS. 1 to 6, the connector 10 according to the present embodiment comprises a plurality of contacts 12 each made of a metal, a holding member 14 made of an insulating material, a shell 20 made of a metal, an eject member 50 made of a metal and a switch portion 90. The contacts 12 according to the present embodiment are insert-molded into the holding member 14 when the holding member 14 is formed so that the contacts 12 are held by the holding member 14. The shell 20 has small height in the Z-direction, opposite ends in the Y-direction and opposite ends in the X-direction so that the shell 20 has a boxlike shape. The shell 20 is configured to accommodate the card (not shown). More specifically, the shell 20 has an upper portion 20u having a front end 20f, opposite side portions 20s and a rear wall 20b so that the connector 10 is formed with an accommodation portion which is able to accommodate the tray 200 mounting the card (not shown). As can be seen from FIG. 1, a size of the front wall 230 of the tray 200 in the Y-direction is larger than a size of the shell 20 in the Y-direction (i.e. a distance between the opposite side portions 20s). The positive Y-side end (i.e. one of the lateral ends) of the front wall 230 according to the present embodiment largely projects along the positive Y-direction over the positive Y-side side portion 20s (i.e. one of the side portions 20s) of the shell 20.

Figure 7:
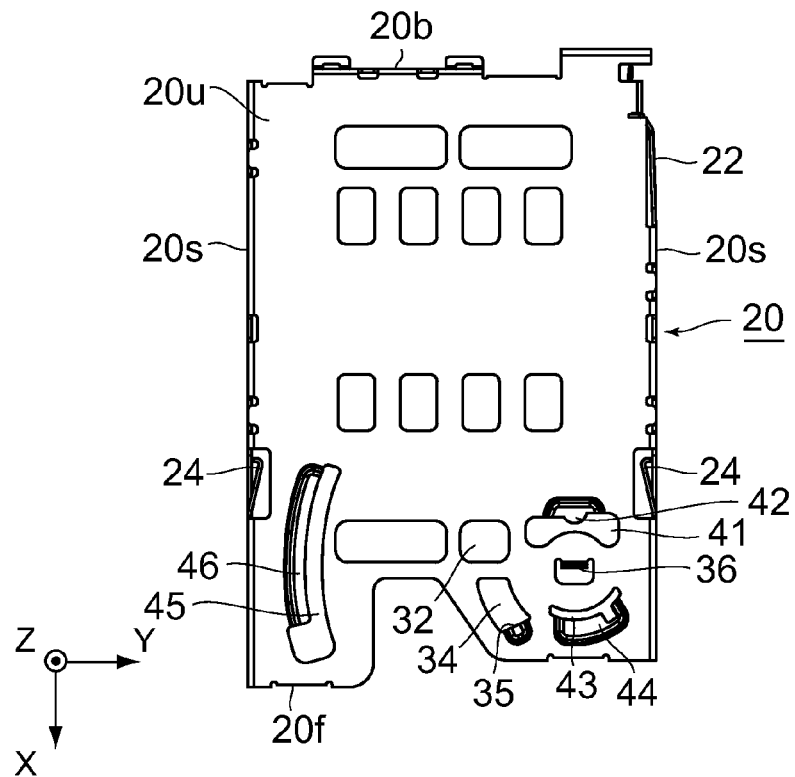
FIG. 7 is a plan view showing a shell of the connector of FIG. 4.
Figure 8:
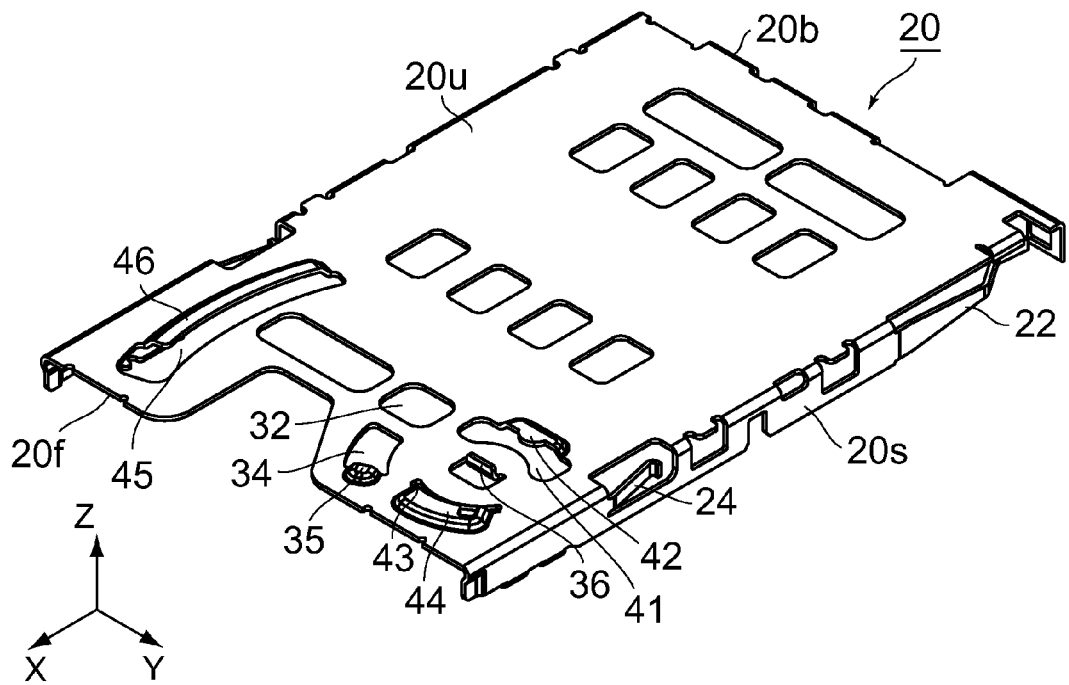
FIG. 8 is a perspective view showing the shell of FIG. 7.

As shown in FIGS. 7 and 8, one of the side portions 20s of the shell 20 is formed with a switch arm 22. The switch arm 22 together with the switch portion 90 (see FIGS. 1 and 2) is configured to detect whether the tray 200 and the card (not shown) are accommodated in the accommodation portion of the connector 10 or not. Furthermore, each of the side portions 20s is formed with a holding spring 24. Each of the holding springs 24 has a tip portion having a hook-like shape. As shown in FIGS. 1 and 2, the tip portions of the holding springs 24 are received in the respective recesses 260 when the tray 200 is inserted in the connector 10 so that an accommodated state where the tray 200 is accommodated in the accommodation portion of the connector 10 is kept.

As shown in FIGS. 7 and 8, the upper portion 20u of the shell 20 is formed with a first receiving hole 32, a second receiving hole 34, a first attached hole (attached hole) 41, a second attached hole (attached hole) 43 and a third attached hole (attached hole) 45. Each of these holes pierces the upper portion 20u in the Z-direction. The first receiving hole 32 and the second receiving hole 34 are spaced from each other. The second receiving hole 34 has an end in the positive X-direction (eject direction). In other words, the second receiving hole 34 has a positive X-side end. The shell 20 is provided with a shell-side stopper 35. The shell-side stopper 35 is formed at the positive X-side end of the second receiving hole 34 so as to protrude along the positive Z-direction (i.e. protrude upward).

The shell 20 is provided with a pivot piece 36. The pivot piece 36 is located between the first attached hole 41 and the second attached hole 43. The pivot piece 36 is formed to extend long in the Y-direction and to rise upward from the upper portion 20u of the shell 20 so that the pivot piece 36 has a roughly rectangular shape. The pivot piece 36 is located apart from the front end 20f of the upper portion 20u in a certain distance. Therefore, the shell 20 is hardly deformed even when a force is applied to the pivot piece 36.

The upper portion 20u of the shell 20 is further formed with a first guard portion (guard portion) 42, a second guard portion (guard portion) 44 and a third guard portion (guard portion) 46. The guard portions 42, 44 and 46 protrude along the positive Z-direction (i.e. protrude upward) while partially covering over the attached hole 41, 43 and 45, respectively.

Figure 9:
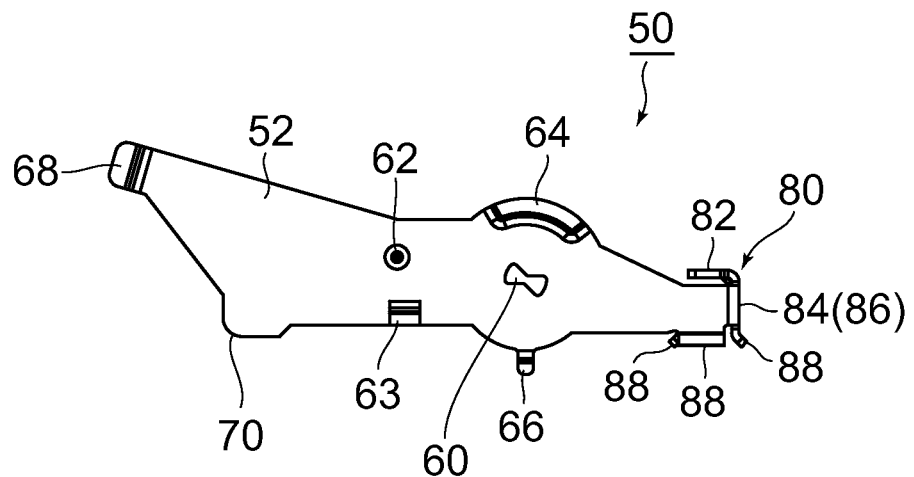
FIG. 9 is a plan view showing the eject member of the connector of FIG. 4.
Figure 10:
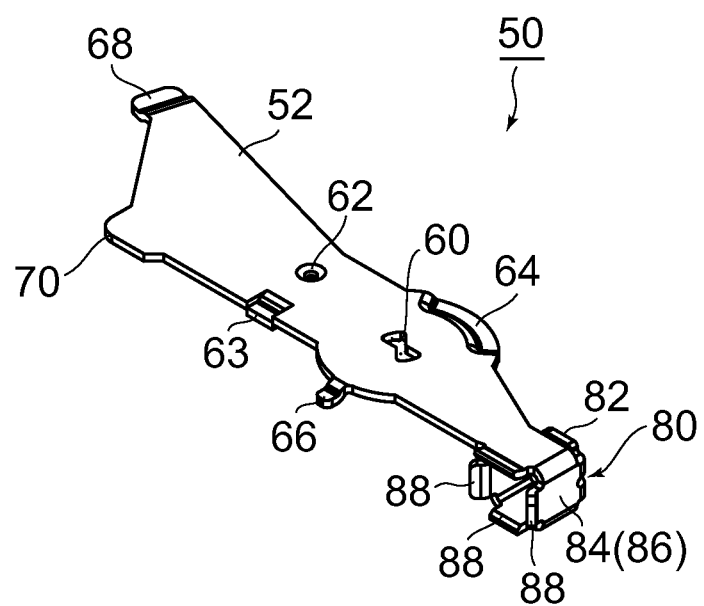
FIG. 10 is a perspective view showing the eject member of FIG. 9.
Figure 11:
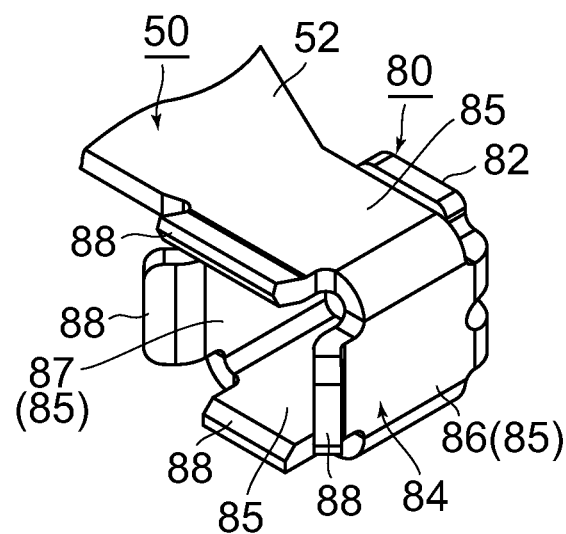
FIG. 11 is a partially enlarged, perspective view showing about a pressed portion of the eject member of FIG. 10.

As shown in FIGS. 9 to 11, the eject member 50 is formed by punching and bending a single metal plate. The eject member 50 has a body portion 52 having a board-like shape.

The eject member 50 is formed with an axis 60. The axis 60 according to the present embodiment is a hole having a roughly dumbbell shape and piercing the body portion 52. As can be seen from FIGS. 1 to 6, the pivot piece 36 of the shell 20 is inserted in the axis 60 so as to support the eject member 50. In detail, the eject member 50 is supported by the shell 20 so as to be pivotable about the axis 60 between an accommodate position (the position illustrated by dashed lines in FIG. 3) and an eject position (the position illustrated by continuous lines in FIG. 3). The connector 10 is able to accommodate at least a part of the tray 200 and the card (not shown) mounted on the tray 200 when the eject member 50 is located at the accommodate position. When the eject member 50 pivots to the eject position, the tray 200 and the card (not shown) mounted on the tray 200 are ejected from the connector 10 so that it is possible to take out the card (not shown) from the tray 200. More specifically, while the eject member 50 pivots from the accommodate position to the eject position, the eject member 50 applies a force along the positive X-direction to the force-applied portion 220 of the tray 200 to push out the tray 200 so that the card (not shown) is ejected.

As shown in FIGS. 9 and 10, the body portion 52 of the eject member 50 is provided with a projection 62 and a stopper 63. The projection 62 projects downward (i.e. along the negative Z-direction) from the body portion 52. As can be seen from FIGS. 3 to 5, the first receiving hole 32 of the shell 20 is configured to receive the projection 62 when the eject member 50 attached to the shell 20 is located at the accommodate position. On the other hand, the second receiving hole 34 of the shell 20 is configured to receive the projection 62 when the eject member 50 attached to the shell 20 is located at the eject position. The stopper 63 is formed so as to step down from the body portion 52. When the eject member 50 located at the eject position is forced to pivot over the eject position, the stopper 63 and the shell-side stopper 35 of the shell 20 are brought into abutment with each other so that the eject member 50 is prevented from further pivoting over the eject position. According to the present embodiment, the shell-side stopper 35 protrudes along the positive Z-direction while the stopper 63 is formed to step down along the negative Z-direction so that the eject member 50 is more securely prevented from pivoting over the eject position.

As shown in FIGS. 9 and 10, the eject member 50 is provided with a first attached portion (attached portion) 64, a second attached portion (attached portion) 66 and a third attached portion (attached portion) 68 each of which is formed to step down from the body portion 52. As can be seen from FIGS. 4, 5 and 7 to 10, the guard portions 42, 44 and 46 correspond to the attached portions 64, 66 and 68, respectively. The attached portions 64, 66 and 68 and the guard portions 42, 44 and 46 are configured to prevent the eject member 50 from being removed from the shell 20. More specifically, the first attached portion 64, the second attached portion 66 and the third attached portion 68 are configured to be received in the first attached hole 41, the second attached hole 43 and the third attached hole 45, respectively. In the positive Z-direction, the first guard portion 42, the second guard portion 44 and the third guard portion 46 are located on (i.e. located at the positive Z-side of) the first attached portion 64, the second attached portion 66 and the third attached portion 68 of the eject member 50 attached to the shell 20, respectively. In other words, the eject member 50 is attached to the shell 20 in a manner that the attached portions 64, 66 and 68 are received in the attached holes 41, 43 and 45 so as to be located under (i.e. located at the negative Z-side of) the guard portions 42, 44 and 46, respectively. The guard portions 42, 44 and 46 regulate upward movements (i.e. movements along the positive Z-direction) of the attached portions 64, 66 and 68 of the eject member 50 attached to the shell 20, respectively. In other words, an upward movement (i.e. a movement along the positive Z-direction) of the eject member 50 is regulated so that the eject member 50 is prevented from being removed from the shell 20. According to the present embodiment, while the eject member 50 pivots, the body portion 52 of the eject member 50 extends substantially parallel to the upper portion 20u of the shell 20 so as to be almost brought into contact with the upper portion 20u.

As previously described, the projection 62 is received in the first receiving hole 32 when eject member 50 is located at the accommodate position. The projection 62 is received in the second receiving hole 34 when eject member 50 is located at the release position. On the other hand, when the eject member 50 is located at a position other than both the accommodate position and the release position, the projection 62 rides on a part of the shell 20 which is located between the first receiving hole 32 and the second receiving hole 34 of the shell 20. In other words, the eject member 50 is attached to the shell 20 so that the projection 62 rides on the shell 20 under a state where the eject member 50 is located neither at the accommodate position nor at the eject position. According to the present embodiment, when the projection 62 rides on the shell 20, the body portion 52 of the eject member 50 is urged by the guard portions 42, 44 and 46 so as to be brought into contact with the upper portion 20u of the shell 20. Therefore, a click-feeling is caused when the projection 62 riding on the shell 20 is received into the first receiving hole 32 or the second receiving hole 34.

As shown in FIGS. 1 to 3, 9 and 10, the eject member 50 includes an eject portion 70. The eject portion 70 is configured to apply a force along the X-direction (eject direction) to the force-applied portion 220 of the tray 200 while the eject member 50 pivots from the accommodate position toward the release position. According to the present embodiment, a part of the body portion 52 functions as the eject portion 70. More specifically, the eject portion 70 according to the present embodiment is formed with a part of an edge of the body portion 52. The projection 62 is located between the axis 60 and the eject portion 70 in the Y-direction.

As shown in FIGS. 9 and 10, the eject member 50 is further provided with a pressed portion 80. The pressed portion 80 is formed so as to hang on the positive Y-side end of the body portion 52. The pressed portion 80 according to the present embodiment has a boxlike shape having an opening. As shown in FIGS. 1 to 3, the eject member 50 is pivotable on the axis 60 so that the pressed portion 80 moves in a circular orbit with the axis 60 located at the center thereof while the eject member 50 pivots. The pressed portion 80 is aligned with the rod-like portion 240 of the tray 200 in the X-direction when the eject member 50 is located at the accommodate position. In other words, under the connected state, the front wall 230 of the tray 200 is located in front of the pressed portion 80 in the positive X-direction. Under the connected state, the rod-like portion 240 extends from the front wall 230 toward the pressed portion 80 along the negative X-direction in parallel to the side portion 20s of the shell 20. Moreover, the pressed portion 80 is arranged so that the opening of the boxlike shape faces the rod-like portion 240 in the X-direction. As can be seen from FIGS. 2 and 3, it is possible to press the pressed portion 80 by an operation member 300 separated from the connector 10 and having a tip. When the operation member 300 is inserted into the guide channel 250 along the X-direction under the connected state, the tip of the operation member 300 is guided to the pressed portion 80. In other words, the guide channel 250 pierces the front wall 230 and the rod-like portion 240 so as to guide the tip of the operation member 300 to the pressed portion 80 when the operation member 300 is inserted into the guide channel 250 under the connected state.

Referring to FIGS. 9 and 10, the pressed portion 80 is opposite the eject portion 70 across the axis 60. In other words, the axis 60 is located between the pressed portion 80 and the eject portion 70. Furthermore, according to the present embodiment, the axis 60 is located between the projection 62 and the pressed portion 80.

As can be seen from FIG. 3, when the pressed portion 80 of the eject member 50 located at the accommodate position is pressed by the operation member 300 along the negative X-direction, the eject member 50 pivots from the accommodate position to the eject position so that the eject portion 70 ejects the tray 200 and the card (not shown) along the positive X-direction. In other words, the eject member 50 is configured to eject the card (not shown) along the positive X-direction when the pressed portion 80 is pressed by the operation member 300.

A distance between the axis 60 and the projection 62 is shorter than a distance between the axis 60 and the pressed portion 80. Therefore, when the pressed portion 80 is pressed along the negative X-direction, even if a force applied to the pressed portion 80 is relatively small, the projection 62 received in the first receiving hole 32 may come out of the first receiving hole 32. Moreover, a distance between the axis 60 and the eject portion 70 is longer than a distance between the axis 60 and the pressed portion 80. Therefore, when the pressed portion 80 is pressed to move along the negative X-direction, the eject portion 70 moves a relatively long distance. In other words, according to the present embodiment, the tray 200 projects long from the connector 10 when the tray 200 is ejected.

According to the present embodiment, the pressed portion 80 receives a pressing force from the operation member 300 so that the eject member 50 pivots toward the eject position. The pressing force required for the pivoting of the eject member 50 becomes maximum when the projection 62 comes out of the first receiving hole 32 (i.e. when the eject member 50 begins to pivot from the accommodate portion). According to the present embodiment, a distance between the pressed portion 80 and the axis 60 is designed to be small as possible under a state where the eject member 50 is located at the accommodate position (i.e. a state where the projection 62 is received in the first receiving hole 32). More specifically, when the projection 62 is received in the first receiving hole 32, the pressed portion 80 and the axis 60 are arranged along the Y-direction. In other words, a position of the axis 60 (i.e. a position of the pivot piece 36) in the X-direction is substantially same as a position of the pressed portion 80 in the X-direction. The pressed portion 80 and the axis 60 are thus arranged so that the pressed portion 80 receives the maximum pressing force along a direction perpendicular to the pressed portion 80. As can be seen from the positional relation between the pressed portion 80 and the axis 60, the pressed portion 80 of the eject member 50 attached to the shell 20 is located apart from the front end 20f of the shell 20 in the X-direction so as not to protrude over the front end 20f along the positive X-direction. In other words, the pressed portion 80 is located between the opposite ends of the shell 20 in the X-direction.

As shown in FIG. 11, the pressed portion 80 according to the present embodiment is formed by bending a metal plate so as to have a receiving wall 82 and a side wall 84. The receiving wall 82 has a rectangular shape so that the receiving wall 82 is formed with four sides. The side wall 84 has four side surfaces 85 corresponding to the four sides of the receiving wall 82, respectively. Each of the side surfaces 85 of the side wall 84 extends in a direction oblique to the receiving wall 82. More specifically, each of the side surfaces 85 according to the present embodiment extends in a direction substantially perpendicular to the receiving wall 82. As can be seen from FIGS. 3 and 11, the receiving wall 82 is configured to be brought into abutment with the tip of the operation member 300 so that the pressed portion 80 is pressed by the operation member 300. The side wall 84 extends in a direction crossing the receiving wall 82 so that the side wall 84 is located lateral to the tip of the operation member 300 upon the abutment of the tip of the operation member 300 with the receiving wall 82. The receiving wall 82 according to the present embodiment has no part (for example, no depression) which is configured to be engaged with the tip of the operation member 300. According to the present embodiment, the side wall 84 is configured to enclose around the tip of the operation member 300 in a plane perpendicular to the X-direction under a state where the tip of the operation member 300 is brought into abutment with the receiving wall 82. Therefore, even when the tip of the operation member 300 slides on the receiving wall 82, the tip is stopped by the side wall 84. In other words, the side wall 84 regulates a movement of the tip which is brought into abutment with the receiving wall 82. According to the present embodiment, even if the connector 10 has a reduced size, the operation member 300 is operable without damaging components arranged around a position where the connector 10 is installed. Especially, the aforementioned structure of the pressed portion 80 may effectively regulate the movement of the tip even when the pressed portion 80 moves on a circle.

According to the present embodiment, the side wall 84 extends sufficiently long in the X-direction so as to securely enclose the tip of the operation member 300. Therefore, a most part of the tip of the operation member 300 is received within the pressed portion 80 when the tip of the operation member 300 is brought into abutment with the receiving wall 82. It is difficult to form the pressed portion 80 having the structure described above by press working. The pressed portion 80 according to the present embodiment is formed by bending a part of the eject member 50. Therefore, at least one of the four side surfaces 85 is separated from the receiving wall 82 while at least one of the four side surfaces 85 is directly connected to the receiving wall 82. Any one of the four side surfaces 85 may extend continuously from (i.e. directly connected to) the receiving wall 82. According to the present embodiment, the side wall 84 is arranged so that one of the side surfaces 85 of the side wall 84 is a most outer surface 86 which is located furthest from the shell 20. The most outer surface 86 extends continuously from the receiving wall 82 (see FIGS. 5 and 11). According to the present embodiment, the tip of the operation member 300 tends to slip toward the most outer surface 86 while the eject member 50 pivots (see FIG. 3). The most outer surface 86 directly connected to the receiving wall 82 is stoppable the tip operation member 300 more securely. In general, it is preferable to directly connect the receiving wall 82 to the side surface 85 which has high probability to receive a force from the tip of the operation member 300.

Figure 5:
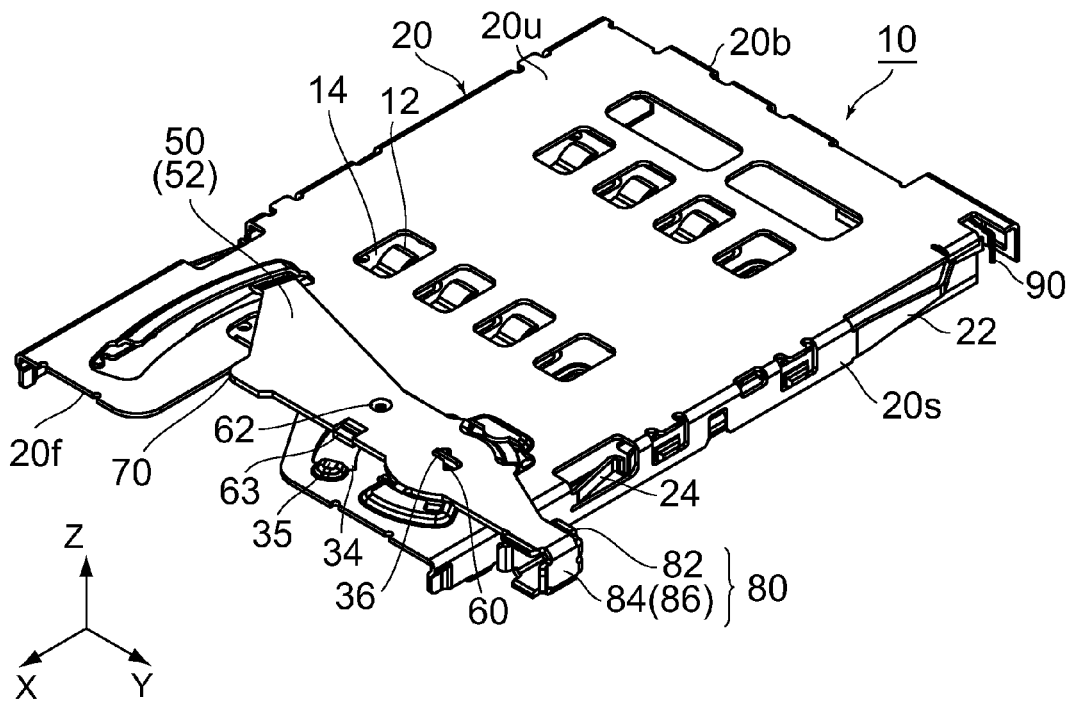
FIG. 5 is a perspective view showing the connector of FIG. 4.
Figure 6:
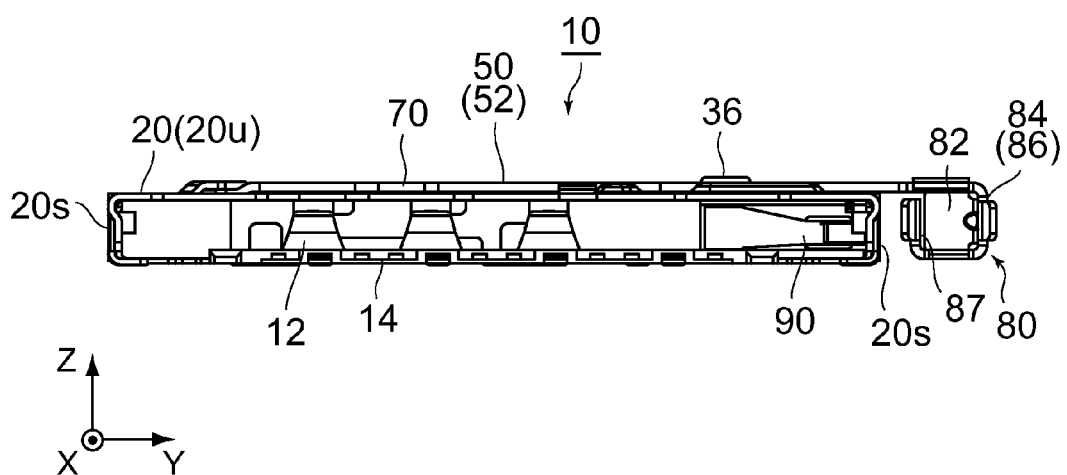
FIG. 6 is a front view showing the connector of FIG. 4.

The side wall 84 according to the present embodiment is formed with the four side surfaces 85 corresponding to the four sides of the receiving wall 82, respectively. As shown in FIGS. 5 and 11, one of the four sides of the receiving wall 82 is arranged so as to be nearer to the shell 20 than the remaining three sides. In other words, the side wall 84 is arranged so that one of the side surfaces 85 of the side wall 84 is a most inner surface 87 which is located nearest to the shell 20. However, the side surfaces 85 may be formed differently. For example, when the pressed portion 80 is configured to be adjacent to the shell 20, it is possible to omit the most inner surface 87 corresponding to one of the four sides of the receiving wall 82. Thus, the side wall 84 according to the present embodiment may be configured so that the side wall 84 has at least three side surfaces 85 corresponding to the remaining three sides of the receiving wall 82, respectively.

Referring to FIG. 11, the side wall 84 of the pressed portion 80 is provided with a guide flare 88. The guide flare 88 is formed on an end of the side wall 84 so as to guide the tip of the operation member 300 toward the inside of the pressed portion 80. More specifically, the guide flare 88 according to the present embodiment is formed on a front end of each of the side surfaces 85 of the pressed portion 80 so that the pressed portion 80 has the four guide flares 88. The guide flares 88 extend forward obliquely to the X-direction so as to open outward from the side wall 84.

According to the present embodiment, the card (not shown) is connected to and ejected from the connector 10 in a state where the card (not shown) is mounted on the tray 200. However, the card (not shown) which is not mounted on the tray 200 may be connected to and ejected from the connector 10 if the card (not shown) has a part which functions as the force-applied portion 220.

The present application is based on a Japanese patent application of JP2011-39047 filed before the Japan Patent Office on Feb. 24, 2011, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector connectable to a card, the connector comprising:
  an eject member including a pressed portion, the eject member being configured to eject the card along an eject direction when the pressed portion is pressed by an operation member which is a separate element from the connector and which has a tip, the pressed portion being formed by bending a metal plate so as to have a receiving wall and a side wall, the receiving wall being configured to be abutted with the tip of the operation member so that the pressed portion is pressed by the operation member, and the side wall extending in a direction crossing the receiving wall so that the side wall is located lateral to the tip upon the abutment of the tip with the receiving wall; and
  a shell configured to accommodate the card;
  wherein:
  the eject member further includes an axis and an eject portion, the eject member being supported by the shell so as to be pivotable around the axis between an accommodating position and an eject position;
  the axis is located between the pressed portion and the eject portion so that the pressed portion moves in a circular orbit with the axis located at a center thereof while the eject member pivots; and
  the eject member pivots from the accommodating position to the eject position when the pressed portion is pressed by the operation member so that the eject portion ejects the card.

2. The connector as recited in claim 1, wherein the eject member is formed by punching and bending a single metal plate.

3. The connector as recited in claim 1, wherein:
  the receiving wall has a rectangular shape so that the receiving wall is formed with four sides, one of the four sides being arranged so as to be nearer to the shell than the remaining three sides; and
  the side wall has at least three side surfaces corresponding to the remaining three sides of the receiving wall, respectively.

4. The connector as recited in claim 3, wherein the side wall is arranged so that one of the side surfaces of the side wall is a most outer surface which is located furthest from the shell, the most outer surface extending continuously from the receiving wall.

5. The connector as recited in claim 3, wherein the pressed portion has a boxlike shape.

6. The connector as recited in claim 1, wherein:
  the eject member is provided with a projection;
  the shell is formed with a first receiving hole and a second receiving hole spaced apart from each other, the first receiving hole being configured to receive the projection when the eject member is located at the accommodating position, and the second receiving hole being configured to receive the projection when the eject member is located at the eject position; and
  the eject member is attached to the shell so that the projection rides on the shell under a state where the eject member is located neither at the accommodating position nor at the eject position.

7. The connector as recited in claim 6, wherein when the projection is received in the first receiving hole, the pressed portion and the axis are arranged along a lateral direction perpendicular to the eject direction.

8. The connector as recited in claim 1, wherein:
  the eject member is provided with an attached portion;
  the shell is provided with a guard portion corresponding to the attached portion; and
  the attached portion and the guard portion are configured to prevent the eject member from being removed from the shell.

9. The connector as recited in claim 1, wherein:
  the eject member is provided with a stopper;
  the shell is provided with a shell-side stopper; and
  when the eject member located at the eject position is forced to pivot over the eject position, the stopper and the shell-side stopper are brought into abutment with each other so that the eject member is prevented from further pivoting over the eject position.

10. The connector as recited in claim 1, wherein:
  the shell has opposite ends in the eject direction; and
  the pressed portion is located between the ends of the shell in the eject direction.

11. A connector connectable to a card, the connector comprising:
  an eject member including a pressed portion, the eject member being configured to eject the card along an eject direction when the pressed portion is pressed by an operation member which is a separate element from the connector and which has a tip, the pressed portion being formed by bending a metal plate so as to have a receiving wall and a side wall, the receiving wall being configured to be abutted with the tip of the operation member so that the pressed portion is pressed by the operation member, and the side wall extending in a direction crossing the receiving wall so that the side wall is located lateral to the tip upon the abutment of the tip with the receiving wall;
  wherein the side wall of the pressed portion is provided with a guide flare, the guide flare being formed on an end of the side wall so as to guide the tip of the operation member toward an inside of the pressed portion.

12. A device comprising the connector as recited in one of claims 1, 2, and 3 to 11, and a tray configured to mount the card, wherein:
  the connector and the tray are configured so that the tray is insertable into the connector in a state where the card is mounted on the tray;
  the tray is provided with a force-applied portion; and
  when the pressed portion is pressed by the operation member, the eject member applies a force along the eject direction to the force-applied portion of the tray to push out the tray so that the card is ejected.

13. The device as recited in claim 12, wherein:
  the tray is provided with a front wall, a rod-like portion and a guide channel;
  the front wall is located forward in the eject direction under an connected state where the card mounted on the tray is inserted into and connected to the connector;
  the rod-like portion extends from the front wall along a pressing direction opposing to the eject direction under the connected state; and the guide channel pierces the front wall and the rod-like portion so as to guide the tip of the operation member to the pressed portion when the operation member is inserted into the guide channel under the connected state.

14. A device comprising a connector connectable to a card, and a tray configured to mount the card, wherein:
the connector comprises an eject member including a pressed portion, the eject member being configured to eject the card along an eject direction when the pressed portion is pressed by an operation member which is a separate element from the connector and which has a tip, the pressed portion being formed by bending a metal plate so as to have a receiving wall and a side wall, the receiving wall being configured to be abutted with the tip of the operation member so that the pressed portion is pressed by the operation member, and the side wall extending in a direction crossing the receiving wall so that the side wall is located lateral to the tip upon the abutment of the tip with the receiving wall;
the connector and the tray are configured so that the tray is insertable into the connector in a state where the card is mounted on the tray;
the tray is provided with a force-applied portion; and
when the pressed portion is pressed by the operation member, the eject member applies a force along the eject direction to the force-applied portion of the tray to push out the tray so that the card is ejected.

15. The device as recited in claim 14, wherein the eject member is formed by punching and bending a single metal plate.

16. The device as recited in claim 14 or 15, wherein:
the tray is provided with a front wall, a rod-like portion and a guide channel;
the front wall is located forward in the eject direction under an connected state where the card mounted on the tray is inserted into and connected to the connector;
the rod-like portion extends from the front wall along a pressing direction opposing to the eject direction under the connected state; and
the guide channel pierces the front wall and the rod-like portion so as to guide the tip of the operation member to the pressed portion when the operation member is inserted into the guide channel under the connected state.

\* \* \* \* \*